United States Patent [19]
Hoffmann et al.

[11] Patent Number: 4,943,028
[45] Date of Patent: Jul. 24, 1990

[54] STEERING COLUMN FASTENING ARRANGEMENT FOR MOTOR VEHICLES WITH A DEFORMATION ELEMENT

[75] Inventors: Martin Hoffmann, Vaihingen-Aurich; Helge Schittenhelm; Franz-Rudolf Wierschem, both of Weissach; Horst Eichhorn, Tamm, all of Fed. Rep. of Germany

[73] Assignee: Porsche AG, Weissach, Fed. Rep. of Germany

[21] Appl. No.: 208,668

[22] Filed: Jun. 20, 1988

[30] Foreign Application Priority Data

Jun. 19, 1987 [DE] Fed. Rep. of Germany ....... 3720320

[51] Int. Cl.⁵ ............................................. F16M 13/00
[52] U.S. Cl. ..................................... 248/548; 74/492; 188/376; 248/900; 280/777
[58] Field of Search ................. 248/548, 900; 280/777; 74/492; 188/371, 376

[56] References Cited

U.S. PATENT DOCUMENTS

| | | |
|---|---|---|
| 3,373,965 | 3/1968 | Bien et al. ......................... 248/900 X |
| 3,394,613 | 7/1968 | Curtindale ............................ 74/492 |
| 3,415,140 | 12/1968 | Bien et al. ......................... 280/777 X |
| 3,597,994 | 8/1971 | Shiomi et al. .......................... 74/492 |
| 3,621,732 | 11/1971 | Kaniut ............................. 248/230 X |
| 3,769,851 | 11/1973 | Edme et al. . |
| 3,856,242 | 12/1974 | Cook .................................... 248/348 |
| 3,868,864 | 3/1975 | Durkee et al. . |
| 4,102,217 | 7/1978 | Yamamoto et al. ............ 280/777 X |
| 4,194,411 | 5/1980 | Manabe et al. ........................ 74/492 |
| 4,786,076 | 11/1988 | Wierschem .......................... 280/777 |

FOREIGN PATENT DOCUMENTS

| | | |
|---|---|---|
| 1936994 | 2/1971 | Fed. Rep. of Germany ........ 74/492 |
| 2814145 | 10/1978 | Fed. Rep. of Germany . |
| 3616246 | 11/1987 | Fed. Rep. of Germany . |
| 2284500 | 5/1975 | France . |

Primary Examiner—David L. Talbott
Attorney, Agent, or Firm—Barnes & Thornburg

[57] ABSTRACT

A steering column fastening for a motor vehicle includes a deformation element between a steering bracket retained at the body and a protective tubular steering member; the deformation element consists of an energy-absorbing plate connected with a bow-shaped bracket member of the protective tubular steering member which plate includes deformation sections which are arranged corresponding with longitudinal slots of the bow-shaped bracket member and in which are guided the displacement bolts extending through the deformation sections. The energy-absorbing plates are arranged between a lower support element of the bow-shaped bracket member and upper guide elements arranged parallel thereto. The upper guide elements are supported at the steering bracket of the body and include longitudinal slots which are arranged corresponding to further longitudinal slots of the lower support element. The guide elements extend over the entire length of the plate-side deformation sections and the latter are laterally delimited by longitudinal slots.

18 Claims, 4 Drawing Sheets

STEERING COLUMN FASTENING ARRANGEMENT FOR MOTOR VEHICLES WITH A DEFORMATION ELEMENT

BACKGROUND AND SUMMARY OF THE INVENTION

The present invention relates to a steering column fastening arrangement of the type disclosed in the German Patent Application No. P 36 16 246.9.

A deformation element is already described in the aforementioned application in connection with the involved embodiment which opposes to a movement of the steering column in case of a crash, a resistance by an energy-absorbing plate which is retained on a bow-shaped bracket member of the steering column.

The object of the present invention resides in providing an improved deformation element which involves a construction with few individual parts that can be easily manufactured and which assures a safe fastening of the steering column on the body side as well as a defined energy absorption in case of a crash.

The underlying problems are solved according to the present invention in that energy-absorbing plates are arranged between a lower support element of the bow-shaped bracket member and upper guide elements arranged parallel thereto which are supported at the steering bracket of the vehicle body and are provided with longitudinal slots which are arranged corresponding with further longitudinal slots of the support element on the side of the bow-shaped bracket member, and in that the guide elements extend over the entire length of the plate-side deformation sections and are each laterally delimited by longitudinal slots.

The advantages attained with the present invention reside in that it is achieved by clamping-in the energy-absorbing plates between a guide element and a support element that tear zones in the longitudinal direction of the slots guided by both elements are formed in the plates. With an energy-absorbing plate not clamped-in on both sides the laterally remaining tongues of the plate may tear off in a disadvantageous manner so that a uniform tearing along the longitudinal slots is no longer possible and no desired deformation behavior is achieved.

Also the friction between the fixed parts and the movable parts of the deformation element is improved by interposition of a slide layer.

It is achieved by a wider construction of the longitudinal slots in the support element of the bow-shaped bracket member than in the guide element that the displacement bolts cannot jam in the bow-shaped bracket member during displacement of the latter and that the torn up material of the plates can expand into the wider slots so that no jamming is caused.

BRIEF DESCRIPTION OF THE DRAWINGS

These and other objects, features and advantages of the present invention will become more apparent from the following description when taken in connection with the accompanying drawing which shows, for purposes of illustration only, two embodiments in accordance with the present invention, and wherein.

DETAILED DESCRIPTION OF THE DRAWINGS

Figure 1:
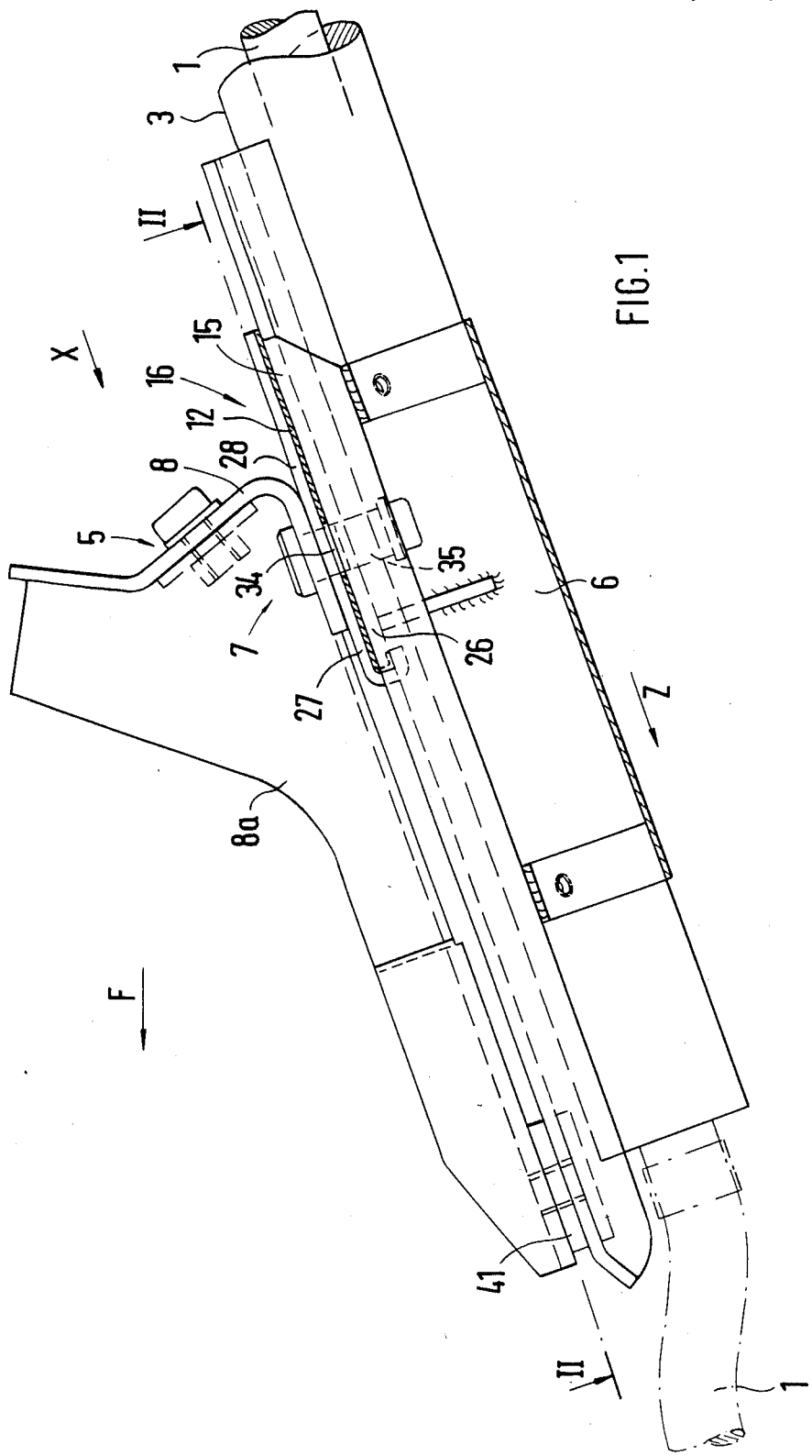
FIG. 1 is a side elevational view of a steering column fastening arrangement with a deformation element according to the present invention.

Referring now to the drawing wherein like reference numerals are used throughout the various views to designate like parts, and more particularly to FIG. 1, as shown in this figure a steering shaft 1 which is supported in a protective tubular steering member 3, is connected with a steering wheel at its end. The steering shaft 1 together with the protective tubular steering member 3 is displaceably retained in the deformation element generally designated by reference numeral 16 in the direction of arrow Z with respect to the vehicle body 5. Of the body 5, a steering bracket 8 is shown which is connected with a further body part 8a extending in the longitudinal direction of the protective tubular steering member 3. A bow-shaped bracket member 6 accommodating the deformation element 16 and connected with the protective tubular steering member 3 is supported at the further body part 8. The bow-shaped bracket member 6 extends in an area from in front of the steering bracket 8 up to the free end of the further body part 8a. At the end of the bow-shaped bracket member 6, this body part 8a is longitudinally displaceably guided in a slide member 41 fixed on the side of the body, as shown more fully in FIG. 1.

Figure 2:
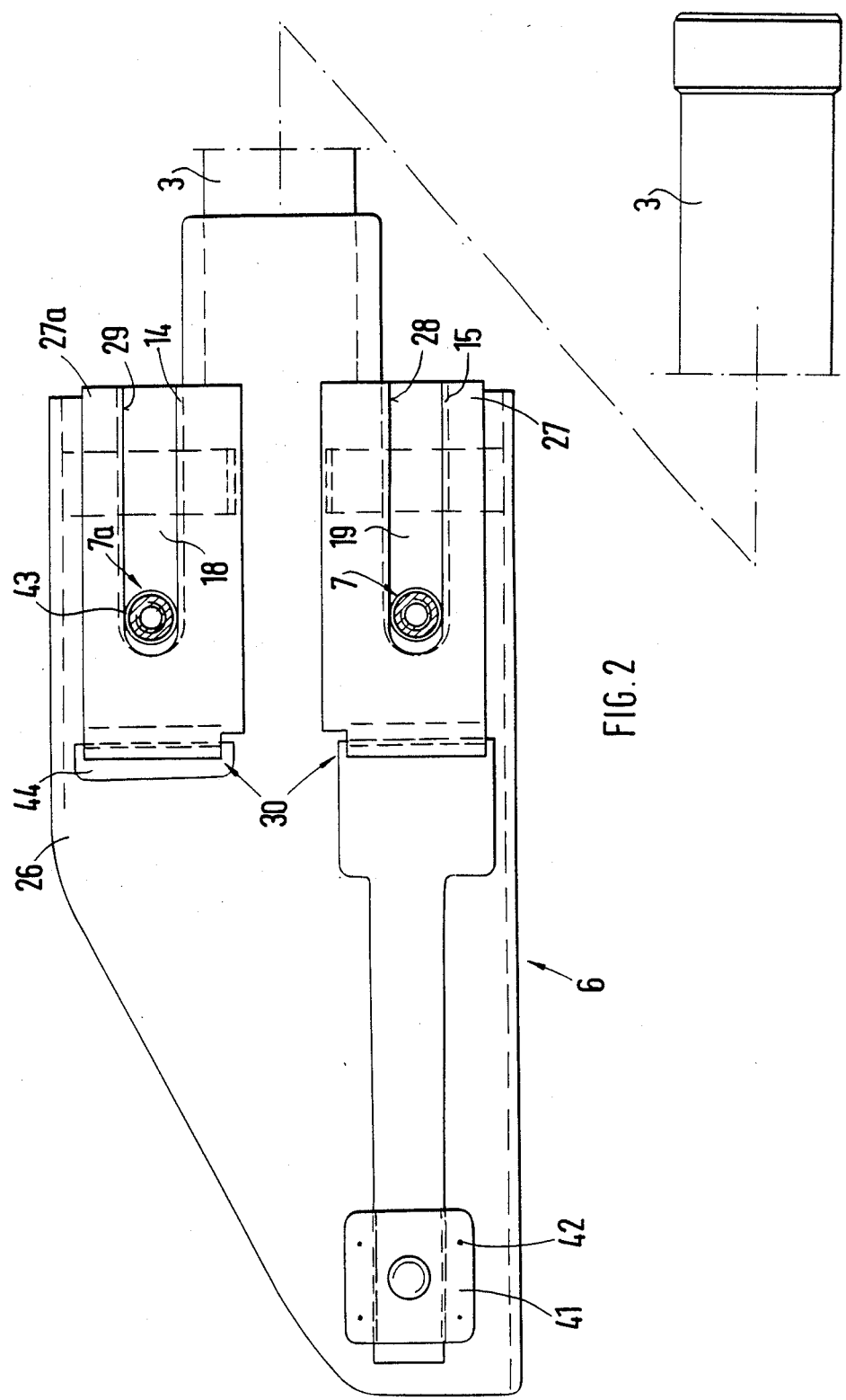
FIG. 2 is a cross-sectional view taken along line II—II of FIG. 1.
Figure 3:
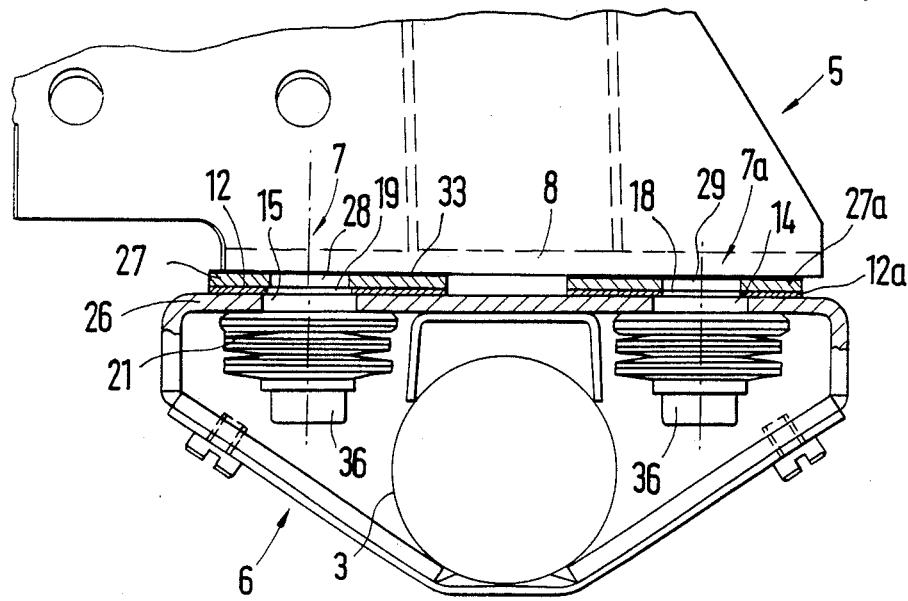
FIG. 3 is an elevational view taken in the direction of arrow X of FIG. 1, partly in cross section.

The deformation element 16 includes two energy-absorbing plates 12 and 12a which are retained between a support element 26 of the bow-shaped bracket member 6 and two guide elements 27 and 27a which abut at a bottom surface 31 of the steering bracket 8. In lieu of two energy-absorbing plates 12 and 12a, also only a single uninterrupted plate is possible. A connection between the bow-shaped bracket member 6 and the steering bracket 8 on the body side under interposition of the deformation element 16 takes place by way of displacement bolts 7 and 7a as well as by way of the slide member 41 which is additionally connected with the bow-shaped bracket member 6 by way of plastic pins 42 (FIG. 2) and is displaceable in the further body part 8a.

The guide elements 27 and 27a as well as the plates 12 and 12a absorbing the energy are bent off hook-like at one end 30 and together claw about a forward end face of the support element 26—as viewed in the driving direction F—for purposes of fixing. The end face 30 is provided, for example, in a recess 44 (FIG. 2) of the support element 26.

Figure 4:
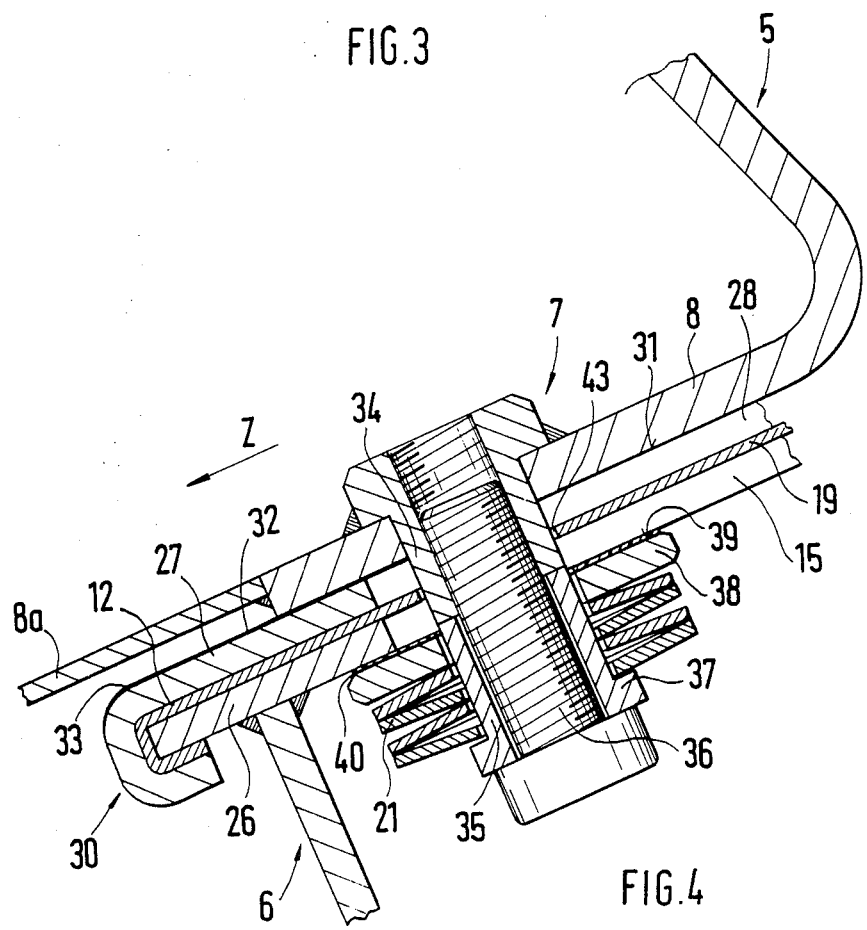
FIG. 4 is a cross-sectional view of the deformation element, shown on an enlarged scale compared to FIG. 1, within the contours of the dash and dotted line according to FIG. 1.
Figure 5:
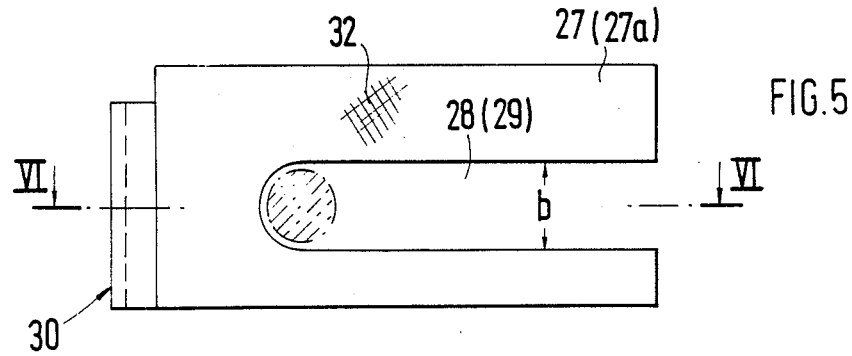
FIG. 5 is a plan view on a guide element.
Figure 6:
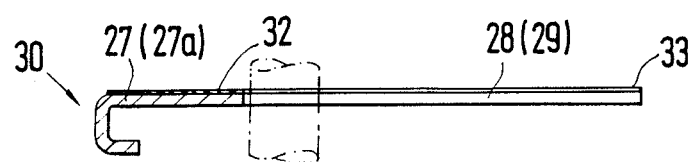
FIG. 6 is a cross-sectional view taken along line VI—VI of FIG. 5.
Figure 7:
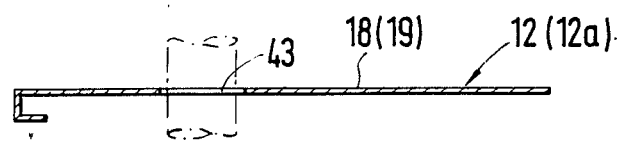
FIG. 7 is a cross-sectional view through an energy-absorbing plate.
Figure 8:
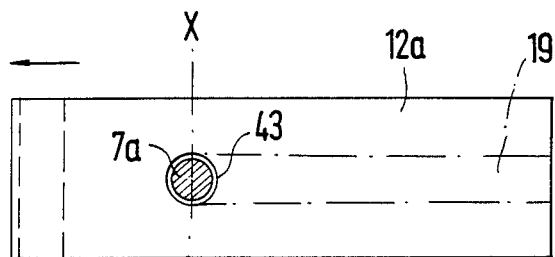
FIG. 8 is a plan view on a modified embodiment of plates in accordance with the present invention for the stepped deformation.
Figure 8:
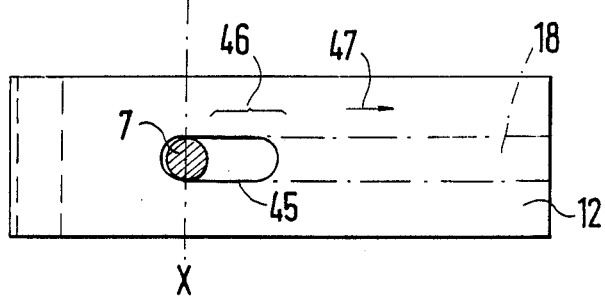

Each plate 12 and 12a between the elements 27, 27a and 26 is provided with a bore 43 (FIGS. 2 and 8) for extending therethrough a displacement bolt 7 and 7a (FIG. 7). The bolts 7 and 7a each include a first threaded bushing 34 (FIG. 4) connected with the steering bracket 8, which extends through the bore 43 and is connected with a second threaded bushing 35 by way of a fastening bolt 36. A disk 38 spring-loaded by a spring 21 is arranged between a collar 37 of the second bushing 35 and the support element 26 on the side of the bow-shaped bracket member; the disk 38 abuts slidingly at the support element 26. The prestress of the spring 21 is so adjusted that the steering system is retained as also a favorable friction is assured between the sliding parts of the deformation element 16. At the same time, the springs 21 serve for tolerance compensation.

A slide layer 33, respectively, 40, for example, of Teflon is provided both between the guide elements 27 and 27a and the steering bracket 8 as also between the disk 38 and the support element 26. In particular, the slide layer 40 is applied on the disk 38 and the slide layer 33 on the guide elements 27 and 27a.

If the steering shaft 1 together with the protective tubular steering member 3 is displaced during a crash in the direction of arrow Z (FIGS. 1 and 2), then the bow-shaped bracket member 6 together with the support element 26 as well as the guide elements 27 and 27a connected with the bow-shaped bracket member 6 and the plates 12 and 12a are displaced relative to the fixed displacement bolts 7 and 7a in the body part 8a. During this movement, the bolts 7 and 7a tear open the plates 12 and 12a along the deformation sections 18 and 19 approximately within the area of the longitudinal slots 28, 29 and 14, 15 whereby the width b of the upper longitudinal slots 28 and 29 which have a greater width with respect to the lower longitudinal slots 14 and 15, assure a corresponding space for the material flow.

For purposes of achieving a defined deformation behavior, the energy-absorbing plates 12 and 12a may consist of different material such as aluminum, plastic material, steel, etc. whereby the deformation sections may be provided with bores, slots and similar apertures within the area of the longitudinal slots of the elements. These arrangements are constructed either symmetrically or asymmetrically corresponding to the desired deformation behaviors.

According to a further embodiment, also more than two displacement bolts as well as energy-absorbing plates coordinated to these bolts may be provided. Thus, a further displacement bolt may be, for example, part of the slide member 41.

The bolts 7 and 7a may, in cooperation with the deformation sections 18 and 19, effect a different beginning of a deformation of the sections 18 and 19 for the stepped energy absorption and a smoothing of the characteristic curves resulting therefrom. For this purpose, for example, the one bolt 7 is arranged in a bore 43 of the plate 12a and the further bolt 7a in an elongated aperture 45 of the plate 12 in a plane X—X (FIG. 8) in such a manner that during a beginning of the displacement of the steering column, the bolt 7a has a free space 46 in front of itself, as shown more fully in FIG. 8, and the further bolt 7 commences a deformation.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A steering column fastening arrangement for a motor vehicle with a deformation means between a steering bracket means retained on the body side and a protective tubular steering member, the deformation means including energy-absorbing plate means operatively connected with a bow-shaped bracket means of the tubular member, and plate means having deformation sections which are arranged corresponding to longitudinal slots of the bow-shaped bracket means, the energy-absorbing plate means frictionally clamped between a lower support element of the bow-shaped bracket means and upper guide elements arranged substantially parallel thereto, the upper guide elements being supported at the steering bracket means of the vehicle body and being provided with longitudinal slots which are arranged corresponding to the further longitudinal slots of the lower support element, displacement bolt means extending through the deformation sections and being guided in both the longitudinal slots, for providing a clamping force to clamp the energy absorbing plate between the lower support element and the upper guide elements, the upper guide and lower support elements extending substantially over the entire length of said deformation sections and said deformation sections being laterally delimited each by the longitudinal slots.

2. A steering column fastening arrangement according to claim 1, wherein the plate means together with the upper guide elements are angularly bent off claw-like and surround an end face of the lower support element.

3. A steering column fastening arrangement according to claim 2, wherein the plate means consist of an aluminum material.

4. A steering column fastening arrangement according to claim 2, wherein the upper guide elements are provided at their surfaces facing the steering bracket means with a slide layer.

5. A steering column fastening arrangement according to claim 4, wherein the longitudinal slots in the lower support element are constructed wider than the longitudinal slots in the upper guide elements.

6. A steering column fastening arrangement according to claim 4, wherein the displacement bolt means includes a first threaded bushing connected with the steering bracket means, which extends through the energy-absorbing plate means and is connected with a second threaded bushing by way of a fastening bolt.

7. A steering column fastening arrangement according to claim 6, wherein a spring-loaded disk, which is arranged between the lower support element and a collar of the second threaded bushing, slidingly abuts at the lower support element.

8. A steering column fastening arrangement according to claim 7, wherein the disk is provided at its surface facing the lower support element with a slide layer.

9. A steering column fastening arrangement according to claim 7, wherein in one of the plate means the bolt means is guided in an elongated aperture which has a free path in the deformation direction whereas the other bolt means is arranged in the bore, and both bolt means are located in substantially the same transverse plane.

10. A steering column fastening arrangement according to claim 9, further comprising spring means having a defined prestress retaining the steering system and producing a relatively slight friction.

11. A steering column fastening arrangement according to claim 1, wherein the plate means consist of an aluminum material.

12. A steering column fastening arrangement according to claim 1, wherein the upper guide elements are provided at their surfaces facing the steering bracket means with a slide layer.

13. A steering column fastening arrangement according to claim 1, wherein the displacement bolt means includes a first threaded bushing connected with the steering bracket means, which extends through the energy-absorbing plate means and is connected with a second threaded bushing by way of a fastening bolt.

14. A steering column fastening arrangement according to claim 13, wherein a spring-loaded disk, which is arranged between the lower support element and a collar of the second threaded bushing, slidingly abuts at the lower support element.

15. A steering column fastening arrangement according to claim 14, wherein the disk is provided at its surface facing the lower support element with a slide layer.

16. A steering column fastening arrangement according to claim 1, wherein the longitudinal slots in the lower support element are constructed wider than the longitudinal slots in the upper guide elements 17. A steering column fastening arrangement according to claim 1, wherein in one of the plate means the bolt means is guided in an elongated aperture which has a free path in the deformation direction whereas the other bolt means is arranged in the bore, and both bolt means are located in substantially the same transverse plane.

18. A steering column fastening arrangement according to claim 1, further comprising spring means having a defined prestress retaining the steering system and producing a relatively slight friction.

* * * * *